Dec. 19, 1950 C. A. MOORE 2,534,469
BAIT RETAINING FISHHOOK
Filed Oct. 28, 1947
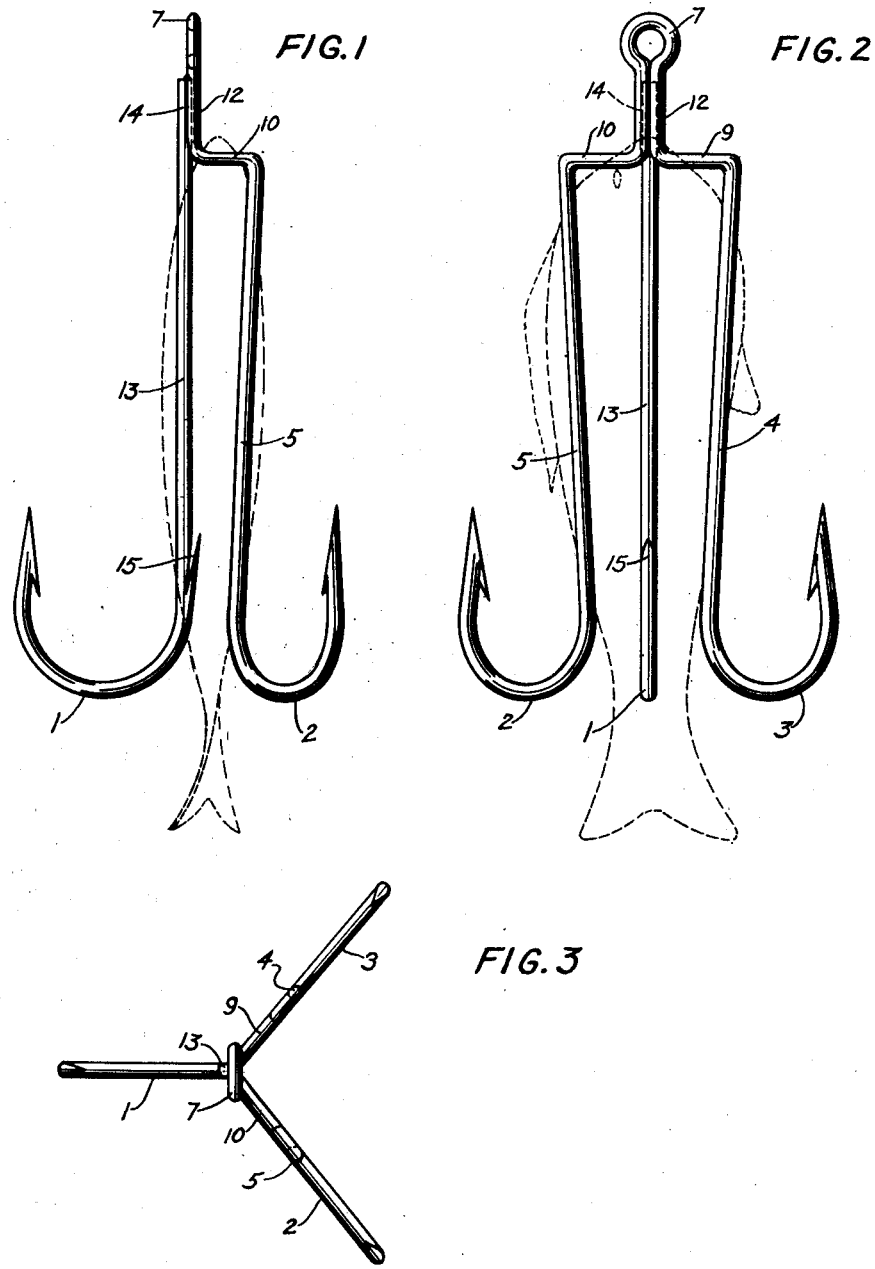
INVENTOR.
CHARLIE A. MOORE
BY
McMorrow, Berman + Davidson
ATTORNEYS Patented Dec. 19, 1950

2,534,469

UNITED STATES PATENT OFFICE 2,534,469

BAIT RETAINING FISHHOOK

Charlie A. Moore, Victoria, Tex.

Application October 28, 1947, Serial No. 782,599

2 Claims. (Cl. 43—44.8)

This invention relates to an improved fish hook, and more particularly to a unitary multi-pointed hook structure adapted to retain the bait in a position to assure that a fish will encounter one of the points in approaching the bait from any side, and to prevent slipping of the bait from the hook when a fish bites above the point of the same.

The invention has for its chief object the provision of a multi-pointed hook structure having shank portions arranged to surround the bait to hold the same securely in position centrally of the points of the hook and acting as a guard to prevent the bait from being stripped from the hook by a fish or through engagement with objects in the water during trolling operation or the reeling in of the fish line.

A further object of the invention is to provide a fish hook of the character referred to having means for preventing the bait from slipping off the shank of a hook, or being shaken therefrom in the casting of the lines.

A still further object of the invention is the provision of a multi-pointed fish hook structure of the type mentioned, which is of simple design and rugged structure, capable of withstanding the rough usage to which such an article is likely to be subjected.

With the above and other objects in view, the invention comprises, briefly stated, a unitary structure formed by joining the shanks of a number of hooks adjacent their upper ends, the mid-portions of the shanks being spaced apart and arranged to receive and retain the bait between them.

The invention will best be understood from the following description, constituting a specification of the same, when taken in conjunction with the annexed drawings, wherein:

Figure 1 is a side elevational view of an embodiment of the invention.

Figure 2 is a front elevational view of the same.

Figure 3 is a plan view of the same, showing the arrangement of the hooks.

Referring to the drawings in greater detail the invention comprises a unitary structure made up of several hooks 1, 2, and 3 arranged at intervals about the central portion of the unit with the points extending generally outwardly and upwardly therefrom. The hooks 2 and 3 may be conveniently formed of one piece of material with the shanks 4 and 5 joined by an upwardly extending eye 7.

The shanks 4 and 5 are preferably bent inwardly at their upper ends to form arms 9 and 10, and upwardly to form the shank portion 12 of the unit.

The shank 13 of the hook 1 extends upwardly beyond the arms 9 and 10 and is joined at its upper end to the shank portion 12, as indicated at 14. At a point near the lower end of the shank 13 a barb 15 may be provided for a purpose later to be made apparent.

The shanks 4, 5, and 13 may be spaced apart a greater distance at their upper ends than at their lower ends, so that they converge slightly downwardly to assist in retaining the bait when the same is inserted in the unit.

It will be understood that any number of hooks can be arranged in the manner described above, and the hooks may be of the same or widely different sizes and styles, depending upon the particular conditions under which the unit is intended to be used, the kind of fish it is desired to catch, or the particular bait employed. The invention is therefore, not to be limited to the particular details of construction shown in the drawing but is capable of various changes in the proportions and arrangements of the various parts. Thus, one or all of the shanks of the hook may be provided with barbs similar to the barb 15 described, and the barbs may be positioned at various locations throughout the lengths of the shanks.

In making use of the unitary bait-retaining hook structure as described above, the same is attached to a fishing line by the eye 7. The bait is then inserted between the converging shanks of the unit where it will be securely held in position by the pressure of the shanks, and by engagement with the barb 15 when the same is provided.

The embodiment of the invention illustrated in the drawing is particularly adapted for use with live bait in the form of minnows. In applying such bait to the unit the point of the hook 1 is inserted in the side of the minnow near its head and forced toward the tail generally parallel with the back-bone of the fish, and the bait is moved head-foremost to a position between the shanks of the hook with the point of the hook 1 emerging from the minnow near its tail.

When brought to this position the barb 15 functions to prevent the bait from slipping downwardly out of the unit, and in addition the pressure exerted on the bait by the downward convergence of the shanks acts to securely maintain the same in adjusted position.

As indicated in dotted lines in Figures 1 and 2 of the drawing, a minnow positioned in the unit as thus described, has its tail extending beyond the lower end of the unit so that the tail will move in a natural fashion as the bait is moved through the water. Furthermore, the uniform distribution of the hook points about the bait and the engagement of the shanks therewith makes it impossible for the bait to be stripped from the unit by a fish without getting caught on one of the hooks. By reason of the arrangement of the arms 9 and 10, at the upper ends of the shanks 4 and 5, extending radially outwardly from the center of the unit, the bait is protected from engagement with objects in the water so that the same will not be removed from the unit by contact with weeds or the like when trolling, or in reeling in the line.

It will thus be seen that the invention provides a multi-hook unit of simple construction, adaptable for use with any suitable kind of bait, and assuring the retention of the bait on the unit under all conditions of use.

Having thus clearly shown and described the invention, what is claimed as new and desire to secure by Letters Patent is:

1. A bait retaining fish hook comprising a plurality of circumferentially spaced apart shank members converging at one end for disposition about a bait longitudinally engaged on one of said shank members, upwardly directed hook members on the convergent ends of said shank members, and inwardly directed arms on certain of said shank members at the divergent ends, and means securing the inner ends of said arms together and to the upper end of the remaining shank member.

2. A bait retaining fish hook comprising a plurality of circumferentially spaced apart shank members converging at one end for disposition about a bait longitudinally engaged between said shank members, upwardly directed hook members on the convergent ends of said shank members, and inwardly directed arms on certain of said shank members at the divergent ends, means securing the inner ends of said arms together and to the upper end of the remaining shank member, and an upwardly directed barb on at least one of said shank members intermediate the length thereof.

CHARLIE A. MOORE.

REFERENCES CITED

The following references are of record in the file of this patent:

UNITED STATES PATENTS

| Number | Name | Date |
| --- | --- | --- |
| 13,649 | Johnson | Oct. 9, 1855 |
| 754,349 | Scott | Mar. 8, 1904 |
| 2,051,651 | Pachner et al. | Aug. 18, 1936 |
| 2,193,103 | Kowalski | Mar. 12, 1940 |